United States Patent [19]

McGlasson et al.

[11] Patent Number: 5,033,917
[45] Date of Patent: Jul. 23, 1991

[54] CHIP EXTRACTION APPARATUS

[75] Inventors: John R. McGlasson, St. Charles; William K. Luebbert, Florissant, both of Mo.

[73] Assignee: McDonnell Douglas Corporation, St. Louis, Mo.

[21] Appl. No.: 572,878

[22] Filed: Aug. 27, 1990

[51] Int. Cl.⁵ .............................................. B23B 47/34
[52] U.S. Cl. ...................................... 408/67; 408/56; 408/72 B; 408/241 B; 409/137
[58] Field of Search ....................... 408/56-61, 408/67, 72 B, 115 B, 241 B, 68; 409/137

[56] References Cited

U.S. PATENT DOCUMENTS

| 994,430 | 6/1911 | Tunks | 408/56 |
| 2,339,324 | 1/1944 | Fischer | 408/58 X |
| 4,209,069 | 6/1980 | Smith | 408/58 X |

Primary Examiner—Steven C. Bishop
Attorney, Agent, or Firm—Guy R. Gosnell; Timothy H. Courson; Benjamin Hudson, Jr.

[57] ABSTRACT

There is provided by this invention a chip extraction apparatus for extracting chip swarf from a workpiece for collection in an external vacuum source. The chip extraction apparatus is comprised of a nosepiece assembly which houses a spring/atmospheric pressure actuated piston for providing telescopic capabilities to a drill bushing. The drill bushing contains an air inlet port for allowing air to be drawn into the interior fo the drill bushing where it will mix with chip swarf. The air application assists chip flow and contributes to efficient vacuum withdrawal of chip swarf from the drill flutes into the vaccum chamber of the nosepiece assembly. The chip swarf is eventually expelled through a vacuum port in the nosepiece assembly to the external vacuum source. Alternative drill bushing configurations are disclosed to provide consistent chip extraction rates for different material requirements and cutting tool types. Additionally, a means for introducing coolant/lubricant or pressurized air to, and removing coolant/lubricant or pressurized air from, the surface of the workpiece is disclosed. The chip extraction apparatus is disclosed in the context of both a portable drill used in conjunction will drill plates and a handheld drill in which the nosepiece assembly is eliminated, but the chip extraction capability is retained.

9 Claims, 2 Drawing Sheets

CHIP EXTRACTION APPARATUS

BACKGROUND OF THE INVENTION

1. Field of the Invention

The present invention relates generally to a chip extraction apparatus for use with a drill and more particularly to a chip extraction apparatus for use with a drill wherein the chip extraction apparatus contains means for extracting the chips from the drill flutes and the surface of the workpiece with an independent vacuum source and means for applying either liquid coolant/lubricant or pressurized air to the drill while the hole is being produced.

2. Description of the Prior Art

In modern drilling processes, it is desirable that chip swarf produced by the drilling operation be continuously removed from the drill flutes, the interior of the hole being produced, and the part surface. If the chip swarf is not adequately removed during the operation, the hole quality and drill life can become unacceptable and operator working conditions can be annoying and potentially unhealthy. Additionally, unremoved chip swarf can contribute to foreign object damage (FOD) to the product being manufactured should it become incorporated into the product; such incorporation may prevent the product from performing its function by obstructing orifices, preventing proper seating of parts during assembly, contaminating reservoirs, interfering with subsequent applications of protective coatings and adding undesired weight to the final product.

In current drilling procedures in which a drill's guide bushing is held in position by a drill plate located adjacent to the workpiece, the chip swarf is commonly either not extracted and left to accumulate in chip slots in the drill plate or is extracted by an external vacuum means which is entirely separate from the drilling equipment. The external vacuum means typically employs a hose and nozzle which is placed near the drilling location. However, in numerous drilling operations, large drill plates are utilized which severely limit the efficiency of the external vacuum means since it may be difficult or impossible to place the hose and nozzle near the drilling location. In the past multiple drill plates have been used to satisfy nozzle accessibility requirements, adding costs to manufacturing operations.

A method of extracting chip swarf in a drilling process is disclosed in U.S. Pat. No. 2,339,324 (hereinafter the '324 patent) by H. R. Fischer which issued on Dec. 9, 1941. The chip collecting attachment disclosed by the '324 patent has an external vacuum means for extracting chip swarf from the surface of the workpiece. However, the chip collecting attachment disclosed by the '324 patent has several deficiencies including the lack of an adequate supply of input air at the surface of the workpiece which severely limits the ability to extract large volumes of chips. The '324 patent contemplates input air being pulled between the drill bushing and the surface of the workpiece and into the flutes of the drill bit; however, this supply of air may be limited and insufficient for removal of large volumes of chips. An additional disadvantage is the use of a manual lever for providing a telescopic drill bushing which requires operator interaction and thus may decrease the efficiency of the drilling process. A further deficiency is the extraction of the chip swarf through a vacuum cavity which is partly restricted by the chuck and spindle of the drill. The chip swarf may jam or otherwise become entangled with the drill chuck and thus impair the drill's operation. The '324 patent also contemplates the use of a spring apparatus located on the external surface of the drill motor which could pose a safety hazard to the operator. The spring is a functional part of the telescopic drill bushing at the front end of drill unit. As the spring is compressed by the external lever an operator's hand could become injured by being caught between the spring coils as they compress.

An alternative method of extracting chip swarf in a drilling process is disclosed in U.S. Pat. No. 4,209,069 (hereinafter the '069 patent) by Bruce W. Smith which issued on June 24, 1980. The chip collecting drill disclosed by the '069 patent has a self-contained vacuum means for extracting chip swarf from within the drill's guide bushing and collecting the chips in a collection cup which is attached to the body of the drill. However, the drill disclosed in the '069 patent has several limitations and deficiencies. A spring positioned in the path of the chip flow will impede chip extraction by becoming entangled with chips during use and thereby hinder its utility. Additionally, a chip collector attached to the body of a drill will increase operator effort and the weight of the drill unit during use as chip swarf accumulates if it is designed to be large to prevent frequent cleansing. If the collector cup is small then frequent, time-consuming disattachment and cleansing, will be needed to keep unit operative. Furthermore, the use of a self-contained vacuum means can impose an additional load on the motor of the drill and thus decrease overall drill performance.

It would be desirable to develop a chip extraction means which is operable from an external vacuum source and which utilizes a direct and clear path for extracting the chip swarf. Additionally, it would be desirable for a chip extraction means to incorporate a means for applying coolant/lubricant or air at the drill point and into the entrance side of the hole before and during the drilling operation.

SUMMARY OF THE INVENTION

There is provided by this invention a chip extraction apparatus for extracting chip swarf from a workpiece for collection in an external vacuum source. The chip extraction apparatus is comprised of a nosepiece assembly which houses a spring/atmospheric pressure actuated piston for providing telescopic capabilities to a drill bushing. Furthermore, the piston inside the nosepiece serves to isolate a vacuum chamber in front of the piston from an atmospheric pressure chamber behind the piston in order to optimize performance. The drill bushing contains an air inlet port for allowing air to be drawn into the interior of the drill bushing where it will mix with chip swarf. The air application assists chip flow and contributes to efficient vacuum withdrawl of chip swarf from the drill flutes into the vacuum chamber of the nosepiece assembly. The chip swarf is eventually expelled through a vacuum port in the nosepiece assembly to the external vacuum source. Alternative drill bushing configurations are disclosed to provide consistent chip extraction rates for different material requirements and cutting tool types. Additionally, a means for introducing coolant/lubricant or pressurized air to, and removing coolant/lubricant or pressurized air from, the surface of the workpiece is disclosed. The chip extraction apparatus is disclosed in the context of both a portable drill used in conjunction with drill plates and a handheld drill in which the nosepiece assembly is eliminated, but the chip extraction capability is retained.

DETAILED DESCRIPTION OF THE PREFERRED EMBODIMENT

Figure 1:
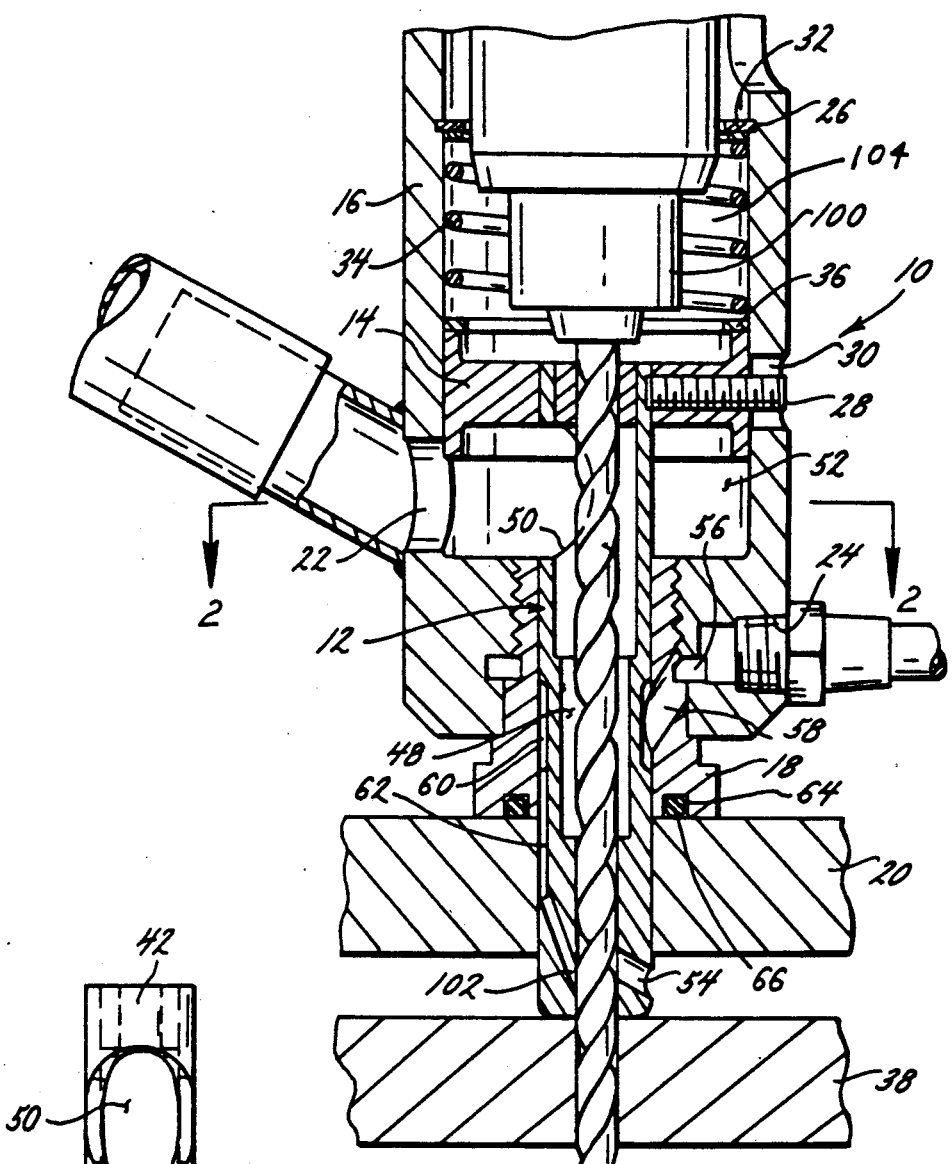
FIG. 1 is a side view of a chip extraction apparatus incorporating the principles of this invention.

Referring to FIG. 1, there is shown a side view of a chip extraction apparatus 10 incorporating the principles of this invention. The chip extraction apparatus is generally comprised of a drill bushing 12 which is connected to a piston 14 which is slidably disposed within a nosepiece 16. The nosepiece 16 is a cylindrical housing which is attachable to portable drilling equipment, such as a Par-A-Matic drill motor, a Cooper HT drill unit, or a Quackenbush drill unit, as is well known to those skilled in the art. Additionally, a lock-on bushing 18 is connected to the nosepiece 16. As shown in FIG. 1, the lock-on bushing 18 may be threadably-connected to the nosepiece 16. As is well known to those skilled in the art, the lock-on bushing 18 is designed to be removably connected to a drill plate 20 so as to accurately position the drill.

The nosepiece 16 incorporates principles of this invention by the inclusion of a vacuum port 22, a coolant port 24, a snap ring groove 26, and a set screw 28 for limiting piston travel by engagement in groove 30 incorporated into nosepiece 16. The drill bushing 12 is inserted in the piston 14 and is restrained from rotating and attached to the piston 14 by the set screw 28 as shown in FIG. 1. The set screw 28 also serves to limit the piston's range of positions since the set screw 28 is only movable within a positioning groove 30 which is cut in the wall of the nosepiece 16. The piston 14 is thus limited to those axial positions within the nosepiece 16 which correspond to positions of the set screw 28 which are within the positioning groove 30. The piston 14 also provides the means to keep the chip swarf separated from the drill chuck 100 and the components of the spring assembly (consisting of a snap ring 32, a spring 34, and a spacer ring 36) that accomplish the preload requirements for the telescopic nosepiece hereinafter described.

An additional feature of this invention is the telescopic effect on the drill bushing 12 generated by the utilization of a snap ring 32, a spring 34, and a spacer ring 36. The snap ring 32 is positioned in the snap ring groove 26 to provide a rigid support for one end of the spring 34. The spring 34 is positioned within the nosepiece 16 to provide an axial force to the piston 14 and drill bushing 12 combination. The piston is also urged axially forward by the atmospheric pressure chamber 104 located behind the piston. Absent a resistive force on the drill bushing 12, such as a surface to be drilled, the drill bushing will be forced to its maximum extension, limited only by the set screw 28 which limits the positions which the piston 14, and thus the drill bushing 12, may take to those positions which maintain the position of the set screw 28 within the positioning groove 30. The spacer ring 36 may be inserted between the spring 34 and the piston 14 to increase or decrease spring pressure requirements.

The telescoping effect of the drill bushing 12 insures that the drill bushing 12 will press firmly against the surface of the workpiece 38 despite variations in drill plate thickness. This pressure asserted by the drill bushing 12 at the surface of the workpiece 38 restrains the fibers of composite workpiece materials and reduces the occurrence of splintering and delaminations at the hole's periphery and prevents vacuum and coolant/lubricant leaks at the part surface.

Figure 3:
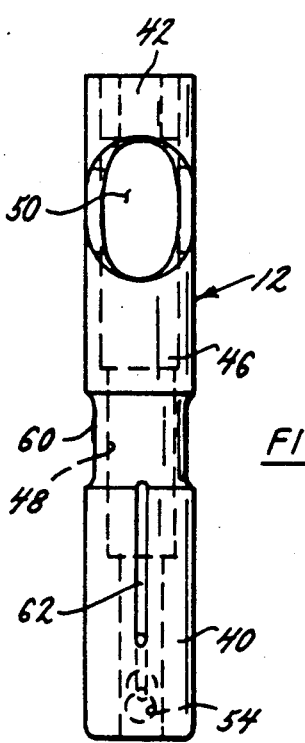
FIG. 3 is a side view of a drill bushing incorporating the principles of this invention.
Figure 2:
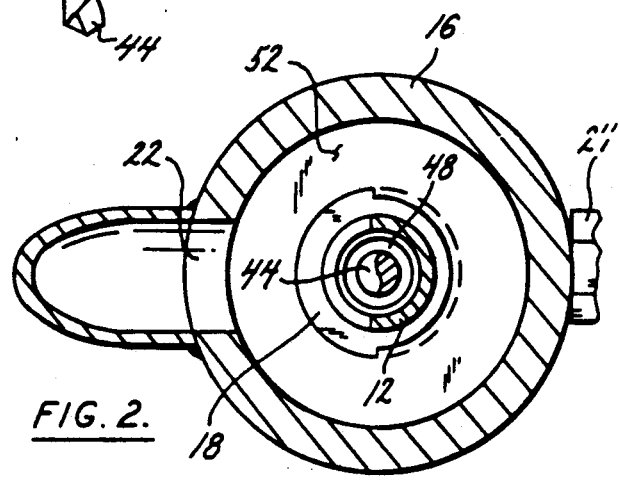
FIG. 2 is a sectional view of the chip extraction apparatus shown in FIG. 1 taken along line 2—2.

Drill bushing 12, as shown in FIG. 3, has a front section 40 and a rear section 42 with inside diameters which approximately equal the diameter of drill bit 44 as shown in FIG. 2. Thus, while the seal between the drill bit 44 and the interior walls of the front section 40 and rear section 42 is not airtight, it is snug enough that only small amounts of air will leak through when the vacuum is engaged as hereinafter explained. The drill bushing 12 has a center section 46 which has an inside diameter which is substantially greater than the diameter of the drill bit 44 so as to create a drill bushing cavity 48 as shown in FIG. 2 between the interior walls of the center section 46 and the drill bit 44. As shown in FIG. 1, the center section 46 has a suction port 50 which connects the drill bushing cavity 48 to a vacuum chamber 52 located between the piston 14 and the lock-on bushing 18 in the nosepiece 16. The vacuum chamber 52 as illustrated in FIG. 2 is connected to an external vacuum source via the vacuum port 22.

An additional feature of the drill bushing 12 is an air inlet port 54 located near the tip of the drill bushing 12 which will be in contact with the workpiece 38. The chip swarf, which is collected by the external vacuum source, is pulled, along with the air entering the air inlet port 54, through the rotating flutes of the drill bit 44 into the drill bushing cavity 48. The chip swarf is then extracted from the drill bushing cavity 48 via the suction port 50 into the vacuum chamber 52. From the vacuum chamber 52, the chip swarf is pulled through vacuum port 22 for eventual collection in the external vacuum source. In this manner, chip swarf is removed from the surface of the workpiece 38 as it is generated during the drill operation. This provides the benefits of improved hole quality and clean work environment.

The extraction of chip swarf is optimized by the utilization of the piston 14 inside the nosepiece 16 which isolates the vacuum chamber 52 in front of the piston 14 from the atmospheric pressure chamber 104 behind the piston 14. This configuration optimizes chip extraction since it allows maximum vacuum and air flow velocity for the removal of chip swarf with minimal air leakage around and through the piston 14. The configuration also provides that the minimal leakage around the piston 14 is sufficient to protect that portion of the inside wall of the nosepiece 16 that is inside the vacuum chamber 52 from abrasive swarf, thus allowing free telescopic movement of the piston and bushing assembly. Additionally, the configuration provides that all chip swarf is expelled from the vacuum chamber, thus all portions of the drill located behind the piston 14 are protected from abrasion and damage.

The particular configuration illustrated in FIGS. 1 and 3 which utilizes a single air inlet port 54 is best suited for use with two-fluted drill bits. While alternative configurations could be utilized, such as the use of two or more air inlet ports or a larger or smaller air inlet port, the use of a single air inlet port 54 with a 5/64 inch diameter located 180° from the suction port 50 and the smaller angled port 102, used to inject coolant/lubricant or pressurized air, allows for the drill rotation to create alternating pressure and vacuum conditions at the surface of the workpiece 38. This alternating pressure and vacuum condition effectively creates a pulsating condition within the drill flutes that assists in maintaining a consistent chip expulsion rate. Additionally, the air inlet port 54 may be angled so that external air, drawn by the vacuum, provides a flow direction toward the suction port 50. This positioning of the air inlet port 54 was found to create a greater chip expulsion rate than air inlet ports positioned parallel to the surface of the workpiece 38 or air inlet ports oppositely angled. However, the scope of this invention covers both angled air inlet ports and those air inlet ports positioned parallel to the surface of the workpiece 38.

When other cutter types are used, such as reamers which have multi-flutes, additional air inlet ports may be desirable to assist chip explusion. For example, for a three-fluted drill it may be desirable to utilize a drill bushing with three inlet ports 54 equally spaced from one another to create the pulsating condition previously described for maintaining a consistent chip expulsion rate.

An additional feature of the invention is the ability to introduce coolant/lubricant at the end of the cutting tool at the surface of the workpiece 38. The ability to introduce coolant/lubricant is accomplished by the use of a coolant port 24 which allows coolant/lubricant from an external coolant source to enter the nosepiece 16. The coolant/lubricant flows through the coolant port 24 to an annular recessed groove 56 machined into the wall of the nosepiece as shown in FIG. 1. The lock-on bushing 18 which is connected to the nosepiece 16 has a coolant port 58 extending angularly through its sidewall for carrying the coolant from the annular recessed groove 56 to the annular drill bushing recess 60 shown in FIGS. 1 and 3. The coolant/lubricant flows from the drill bushing recess 60 through the coolant/lubricant channel 62 to the interior of the drill bushing 12 through angled port 102. The angled port 102 distributes the coolant/lubricant to the cutting tool point at the surface of the part 38. The drill plate 20 encloses the channel 62 to prevent coolant/lubricant loss during pressuization. This method of coolant/lubricant containment simplifies bushing manufacture by eliminating the need for integral ports within the bushing.

To insure that fluid does not leak between the drill plate 20 and the lock-on bushing 18, an annular groove 64 is machined on the end face of the lock-on bushing 18. An O-ring seal 66 is inserted in the annular groove 64 to prevent coolant/lubricant from escaping from the coolant/lubricant channel 62. Also, the vacuum system previously described removes the spent coolant/lubricant following its application to the surface of the workpiece so as to maintain a clean work environment.

Figure 4:
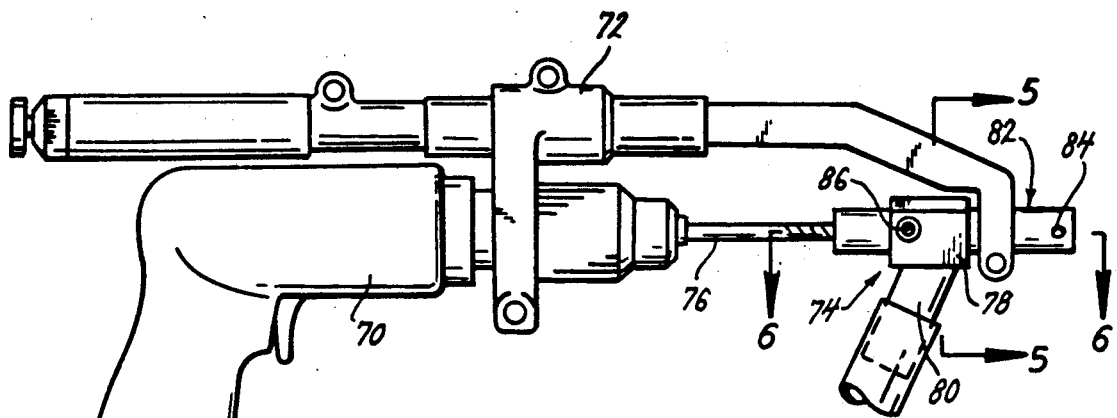
FIG. 4 is a side view of a handheld drill with an attached chip extraction apparatus.
Figure 5:
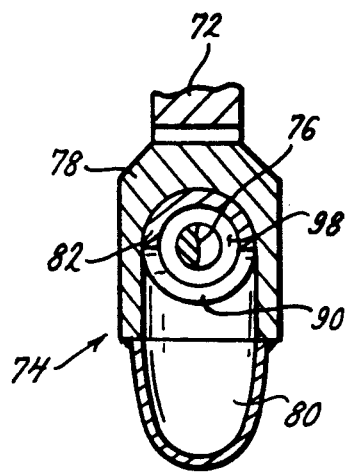
FIG. 5 is a sectional view of the chip extraction apparatus shown in FIG. 4 taken along line 5—5.

An alternative embodiment of the chip extraction apparatus adapted for use with handheld drilling equipment, encompassing both a drill and a drill motor, is shown in FIG. 4. The handheld drill 70 utilizes a bushing adapter 72 to align the chip extraction apparatus 74 and the drill bit 76. The bushing adapter 72 may be of the type shown in U.S. Pat. No. 3,397,600 entitled Bushing Adapter for Drill Units issued to W. G. Wells on Aug. 20, 1968. The chip extraction apparatus 74 is generally comprised of a cylindrical housing 78 with an extraction port 80 and a drill bushing 82 with an air inlet port 84.

As shown in FIG. 4, the drill bushing 82 is held in position and prevented from rotating by the bushing adapter 72. The housing 78 is then fixed in position by means of a set screw 86 which attaches the housing 78 to the drill bushing 82. The housing 78 has a circular aperture in each end with a diameter that is approximately equal to that of the exterior diameter of the drill bushing 82. Thus, while an airtight seal is not maintained between the housing 78 and the drill bushing 82, it is snug enough that only small amounts of air will leak through when the vacuum is engaged as hereinafter explained. The housing 78 has an extraction port 80 which is aligned with a vacuum passage 90 of the center section 96 of the drill bushing 82 so as to enable a proper vacuum function as hereinafter explained.

Figure 6:
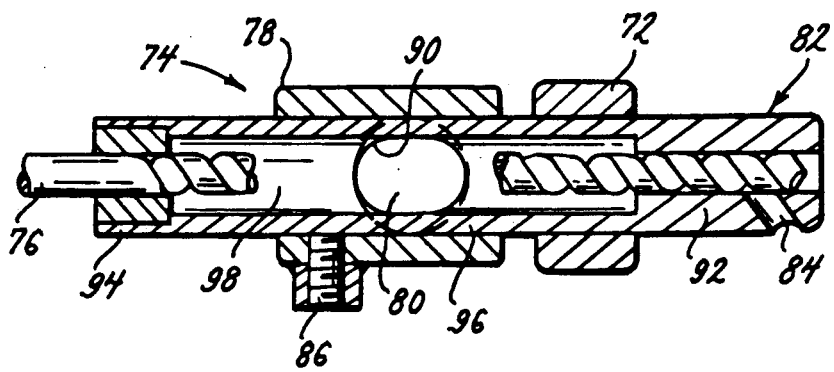
FIG. 6 is a sectional view of the chip extraction apparatus shown in FIG. 4 taken along line 6—6.

As previously explained, the drill bushing is typically composed of three sections as shown in FIG. 6. The front section 92 and the rear section 94 have interior diameter which approximately equal the diameter of the drill bit 76. By contrast, the center section 96 has an interior diameter which is substantially larger than that of the drill bit 76. Thus, an annular drill bushing cavity 98 is formed between the drill bit 76 and the interior wall of the center section 96 of the drill bushing 82. The drill bushing cavity 98 is large enough to permit adequate passage for the chip swarf as it is drawn through the flutes of the drill bit 76 to the vacuum passage 90 as hereinafter explained.

Once an external vacuum source is attached to the output port 80 and is engaged, the chip extraction apparatus removes chip swarf from the workpiece and collects them in the external vacuum source. The external vacuum source draws air through the air inlet port 84 into the interior of the drill bushing 82 where it mixes with the chip swarf produced by the drilling operation. The air and chip swarf are then drawn away from the workpiece through a flute of the drill bit 76. The external vacuum source continues to pull the air and chip swarf from the flutes of the drill bit 76 into the drill bushing cavity 98 and then through the vacuum passage 90 into the extraction port 80 toward the external vacuum source where they will be deposited.

As explained previously in the context of a portable drill, the particular configuration illustrated in FIGS. 4 and 6 which utilizes a single air inlet port 84 is best suited for use with two-fluted drill bits. While alternative configurations could be utilized, such as the use of two or more air inlet ports or a smaller or larger air inlet port, the use of a single air inlet port 84 with a 5/64 inch diameter located 90° from the extraction port 80 allows for the drill rotation to create alternating pressure and vacuum conditions at the surface of the workpiece. This alternating pressure and vacuum condition effectively creates a pulsating condition within the drill flutes to assist in maintaining a consistent chip expulsion rate. Additionally, the air inlet port 84 is angled so that external air enters the air inlet port 84 at a point closer to the workpiece than that at which it exits within the drill bushing 82. This positioning of the air inlet port 84 was found to create a greater chip explusion rate than air inlet ports positioned parallel to the surface of the workpiece or air inlet ports oppositely angled. However, the scope of this invention covers both angled air inlet ports and those air inlet ports positioned parallel to the surface of the workpiece.

For use with other cutter types having more than two flutes, additional air inlet ports may be desirable to provide an adequate chip expulsion rate. For example, for a three-fluted drill bit it may be desirable to utilize a drill bushing with two air inlet ports positioned 180° from one another to create the pulsating condition previously described so as to maintain a consistent chip expulsion rate.

Although there has been illustrated and described specific detail and structure of operations, it is clearly understood that the same were merely for purposes of illustration and that changes and modifications may be readily made therein by those skilled in the art without departing from the spirit and the scope of this invention.

We claim:

1. In combination with drilling equipment, a chip extraction apparatus attached thereto, comprising:
    a) a nosepiece assembly comprising a vacuum chamber for temporarily collecting chip swarf and a vacuum port interconnecting said vacuum chamber with an external vacuum source for passing the chip swarf from said vacuum chamber to said external vacuum source;
    b) a piston apparatus, slidably disposed in said nosepiece assembly, having a first side bounding said vacuum chamber;
    c) a guide bushing, attached to said piston apparatus, having at least one air inlet port and an output port for discharging air and chip swarf to said vacuum chamber; and
    d) a means for retractably extending said guide bushing within said nosepiece assembly.

2. The chip extraction apparatus as recited in claim 1, wherein the retractable extension means is a spring disposed adjacent to a second side of said piston apparatus.

3. The chip extraction apparatus as recited in claim 2, having a single air inlet port, wherein said air inlet port and the output port of the guide bushing are positioned on opposite sides of said guide bushing.

4. The chip extraction apparatus as recited in claim 3, wherein the single air inlet port of the guide bushing is angularly positioned to input air external to said guide bushing at a first distance from a workpiece and discharge the air within said bushing at a first distance from a workpiece, wherein the second distance is greater than the first distance.

5. The chip extraction apparatus as recited in claim 2, wherein a plurality of air inlet ports are positioned equidistant about the circumference of the guide bushing.

6. The chip extraction apparatus as recited in claim 5, wherein the plurality of air inlet ports of the guide bushing are angularly positioned to input air external to said guide bushing at a first distance from a workpiece and discharge the air within said bushing at a second distance from the workpiece where the second distance is greater than the first distance.

7. The chip extraction apparatus as recited in claim 2, wherein the guide bushing has a means for introducing a coolant to a surface of a workpiece.

8. The chip extraction apparatus as recited in claim 2, wherein the guide bushing has a means for introducing a lubricant to a surface of a workpiece.

9. The chip extraction apparatus as recited in claim 2, wherein the guide bushing has a means for introducing pressurized air to a surface of a workpiece.

* * * * *